(12) United States Patent
Barlas

(10) Patent No.: US 9,302,819 B2
(45) Date of Patent: Apr. 5, 2016

(54) REUSABLE TWO-WAY SELF-MAILING BAG

(71) Applicant: Power2Sustain, Santa Cruz, CA (US)

(72) Inventor: Mitchell E. Barlas, Santa Cruz, CA (US)

(73) Assignee: Power2Sustain, Inc., Santa Cruz, CA (US)

( * ) Notice: Subject to any disclaimer, the term of this patent is extended or adjusted under 35 U.S.C. 154(b) by 0 days.

(21) Appl. No.: 14/611,137

(22) Filed: Jan. 30, 2015

(65) Prior Publication Data

US 2015/0210433 A1 Jul. 30, 2015

Related U.S. Application Data

(60) Provisional application No. 61/933,730, filed on Jan. 30, 2014.

(51) Int. Cl.
*B65D 27/06* (2006.01)
*B65D 5/02* (2006.01)
*B65D 75/54* (2006.01)

(52) U.S. Cl.
CPC .............. *B65D 27/06* (2013.01); *B65D 75/545* (2013.01); *Y02W 30/807* (2015.05)

(58) Field of Classification Search
USPC ................................ 229/301, 303, 305; 383/2
See application file for complete search history.

(56) References Cited

U.S. PATENT DOCUMENTS

| 3,989,080 | A | * | 11/1976 | Koszegi | A45C 7/0063 224/582 |
| 5,228,574 | A | | 7/1993 | Rogers | |
| 6,607,122 | B1 | * | 8/2003 | Ong | 229/67.3 |
| 7,909,234 | B2 | * | 3/2011 | Maistrellis | 229/67.4 |
| 8,235,206 | B2 | | 8/2012 | Siegel et al. | |
| 8,287,188 | B2 | | 10/2012 | Hoyord et al. | |
| 8,672,546 | B2 | * | 3/2014 | Jariwala | B65D 27/08 383/2 |
| 2010/0314438 | A1 | * | 12/2010 | Hines | B65D 27/06 229/303 |
| 2011/0155794 | A1 | * | 6/2011 | Russell | 229/68.2 |

* cited by examiner

*Primary Examiner* — Christopher Demeree
(74) *Attorney, Agent, or Firm* — The Mueller Law Office, P.C.

(57) ABSTRACT

In general, the present invention is directed to a reusable two-way mailing bag that may include a pouch configured to receive a shipping or postage label; an internal cavity, the internal cavity further comprising a pocket; and a closing device for closing the internal cavity; configured to be folded into the pocket such that the pouch may be visible. In accordance with some embodiments, a reusable two-way mailing bag may include a double-sided pouch configured to receive a shipping or postage label; an internal cavity comprising a pocket; a zipper for providing access to and closing the internal cavity; and an attachment device; the two-way mailing bag foldable into the pocket such that the double sided pouch is visible when the two-way mailing bag is an folded or unfolded position, and the attachment device engagable to maintain the two-way mailing bag folded into the pocket.

13 Claims, 6 Drawing Sheets

US 9,302,819 B2

REUSABLE TWO-WAY SELF-MAILING BAG

RELATED APPLICATIONS

The present application claims priority to U.S. Provisional Patent Application No. 61/933,730, filed on Jan. 30, 2014, which is incorporated by reference herein in its entirety.

BACKGROUND

In general, the present invention is directed a reusable mailing bag that includes specific portions for the insertion of mailing labels. More specifically, the present invention is directed to a reusable two-way mailing bag that includes one or more portions for the insertion or receipt of one or more mailing labels. Moreover, the present invention is directed to self-mailing bag, which can be folding into itself appropriately for mailing.

The use of plastic bags is deteriorating. Due to the environmental impact—as well as the economic impact of a single-use product, reusable bags are becoming more commonplace. However, the prior art lacks reusable products that can be mailed—specifically, mailed both to recipient and back to an original sender or different party. Such products are desirable in that reusable bags can be mailed to users and returned with various items enclosed, ranging from goods sold and items being donated, to papers and documents which are transmitted back and forth during business transactions.

SUMMARY OF THE INVENTION

Some aspects in accordance with some embodiments of the present invention may comprise include various devices that comprise a reusable bag that may be folded into itself to present a smaller, compact, size suitable for mailing in the typical letter stream, and can be opened into a larger bag for the receipt of goods, documents, and/or other items and mailed again as a package. Moreover, aspects may include one or more pockets configured for the receipt of one or more shipping labels.

Other aspects in accordance with some embodiments of the present invention may include a two-way mailing bag comprising: a pouch configured to receive a shipping or postage label; an internal cavity, the internal cavity further comprising a pocket; and a closing device for closing the internal cavity; the two-way mailing bag configured to be folded into the pocket such that the pouch may be visible.

Other aspects in accordance with some embodiments of the present invention may include a two-way mailing bag comprising: a pouch configured to receive a shipping or postage label; an internal cavity, the internal cavity further comprising a pocket; a closing device for closing the internal cavity; and an attachment device; the two-way mailing bag further configured to be folded into the pocket such that the pouch may be visible, the attachment device engagable to maintain the two-way mailing bag folded into the pocket.

Other aspects in accordance with some embodiments of the present invention may include a two-way mailing bag comprising: a double-sided pouch configured to receive a shipping or postage label; an internal cavity, the internal cavity further comprising a pocket; a zipper for providing access to and closing the internal cavity; and an attachment device; the two-way mailing bag further configured to be folded into the pocket such that the double sided pouch is visible when the two-way mailing bag is an folded or unfolded position, and the attachment device engagable to maintain the two-way mailing bag folded into the pocket.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

Figure 1:
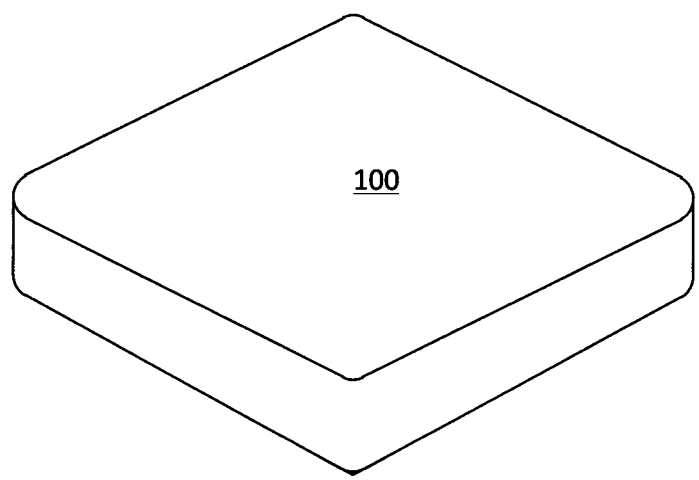
FIG. 1 illustrates a back view of an embodiment of the present invention in which the two-way self-mailing bag is in a folded position.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

In general, the present invention is directed to a self-mailing two way bag. The invention is self-mailing in that it may include an internal pouch into which the bag may be folded, thereby not requiring any additional envelope or packaging. It is a two-way bag in the sense that the bag may be mailed to a recipient in a folded state, opened, filled by the recipient and returned in an opened, filled state.

In order to effectuate mailing, the bag may include one or more pouches configured to receive shipping labels. In accordance with some embodiments of the present invention, the bag may include a single pouch that is viewable from either side of the bag, thereby allowing the bag to receive a label for mailing either, or both, to and from the recipient. In accordance with some embodiments of the present invention, the bag may include a pouch that can be accessed from either side of the bag, or may comprise two or more pouches that may be proximate to each other, or at different locations in the bag.

The bag may be closed by any suitable means, including but not limited to a zipper, channel, zip-lock style closure, hook and loop closure, adhesive closure, mechanical closure, etc. In order to maintain the bag in a closed position for mailing, an additional device, such as but not limited to a mechanical security band may be used.

The present invention may be used for any variety of purposes, including but not limited to, the shipment of new or used goods, shipments that sent to and from a party (such as, but not limited to, business documents). For example, a company that recycles electronic devices may send a bag to a customer in a folded state, and receive the bag filled with electronics for donation. The bag may be prepared with a return label (for example, pre-paid by the company) so that a customer may receive the bag, unfold it from the pouch and turn it inside-out, to expose a prepaid label already positioned in a pouch for return mailing.

With reference to FIG. 1, an exemplary two-way mailing bag 100, in accordance with some embodiments of the present invention, is depicted in a folded state. it can be seen that the two-way mailing bag—is prepared for mailing in a folded position. In practice, this may be used, for example, to provide a mailing bag to a user in order to return, sell, or otherwise ship a product or item. In alternative practices, the two-way mailer may be sent to a user full of items, documents, products, etc., and may be folded into a folded position for return.

Figure 2:
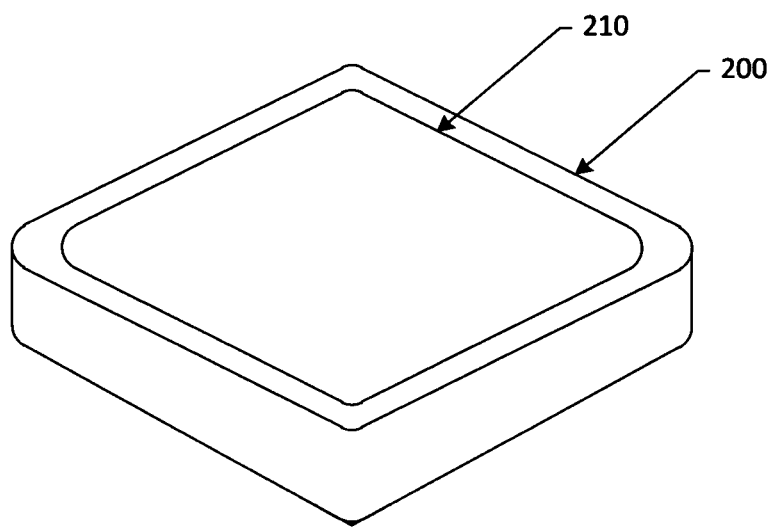
FIG. 2 illustrates a front view of an embodiment of the present invention in which the two-way self-mailing bag is in a folded position, depicting one side of the two way mailing pouch that may receive a shipping label.

With reference to FIG. 2, an exemplary two-way mailing bag 200 in accordance with some embodiments of the present invention is depicted. Two-way mailing bag 200 is in a folded position, with a pouch 210 visible. Pouch 210 may be configured to receive shipping or postage labels or applications.

Figure 3:
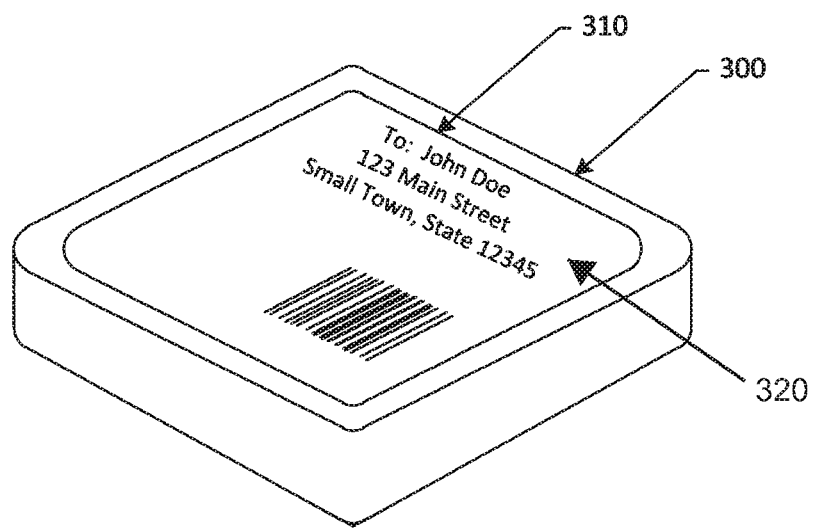
FIG. 3 depicts a front view of an embodiment of the present invention in which the two-way self-mailing bag is in a folded position, depicting a shipping label in one side of the mailing label pouch.

With reference to FIG. 3, an exemplary two-way mailing bag 300 in accordance with some embodiments of the present invention is depicted. Bag 300 may comprise a pouch 310, into which a mailing label 320 (for shipping addresses and/or postage) may be inserted. Note that this mailing label is generally for the first shipment of the two-way mailing bag—to the user.

Figure 4:
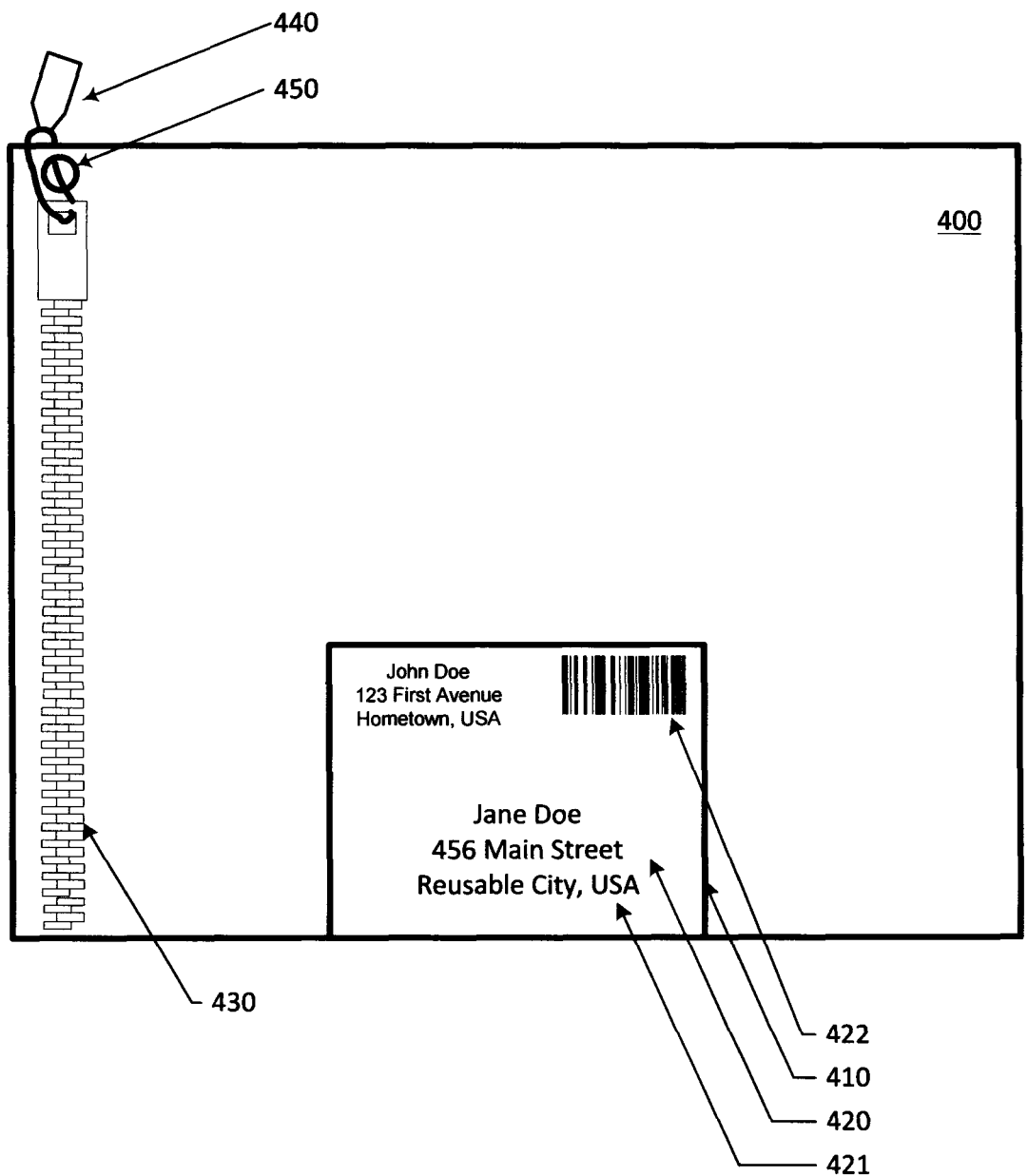
FIG. 4 illustrates an exemplary two way self-mailing bag in accordance with some embodiments of the present invention, in an open position, illustrating a zipper, mailing label, etc.

FIG. 4 illustrates an exemplary two-way mailing bag 400 in an open (non-folded) position. Note that the proportions of the two-way mailing bag 400 in comparison to the mailing label, folded state, zipper, or any other item is not to be seen as limiting. Two-way mailing bag 400 may comprise a pouch 410, into which a shipping or postage label 420 may be inserted. Postage label may be preaddressed 421 and may optionally include an indicia of prepaid postage 422. The two-way mailer bag 400 may comprise a zipper 430 for closing the bag, although it is contemplated that various other mechanisms may be utilized for closing the bag (such as but not limited to, hook-and-loop connections, snaps, magnets, laces, and/or any other type of mechanical connection). In order to prevent the opening from opening during use, a locking tab or device 440 may be utilized. The locking tab or device 440 may engage the zipper or other closing device 430 while also engaging the two-way mailer bag 400, for example through the use of an optional hole 450 to engage the tab or device 440.

In accordance with some embodiments of the present invention, the two-way mailer bag may be sent to a user in a folded position, but with a return label and/or postage already inserted into the pouch. In accordance with some embodiments, the pouch opens both ways so that it can be utilized in both the folded position and in the open position. In other words, a label directing the bag to the user may be placed back-to-back in the pouch with a label directing return of the pouch. Accordingly, a user need only open the folded mailer bag, fill it with items, secure the opening and ship the bag.

Figure 5:
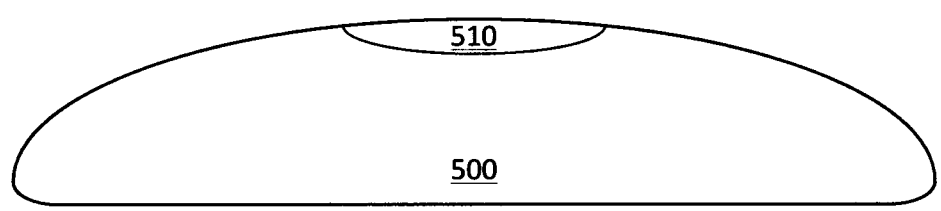
FIG. 5 depicts an embodiment of the present invention in which the two-way self-mailing bag is in an open position, showing an internal pouch into which, in accordance with some embodiments, the mailing bag may be folded during mailing.

With reference to FIG. 5, it can be seen that in accordance with some embodiments of the present invention, when a two-way mailing bag 500 is in an open or unfolded state, an internal pocket 510 may be seen. Internal pocket 510 may be used such that the unused mailing bag may be folded into internal pocket 510 in order to be shipped or mailed in a folded state. During use in an unfolded or open state, the internal pocket 510 may be superfluous, and not impact the functionality of the mailing bag.

Figure 6:
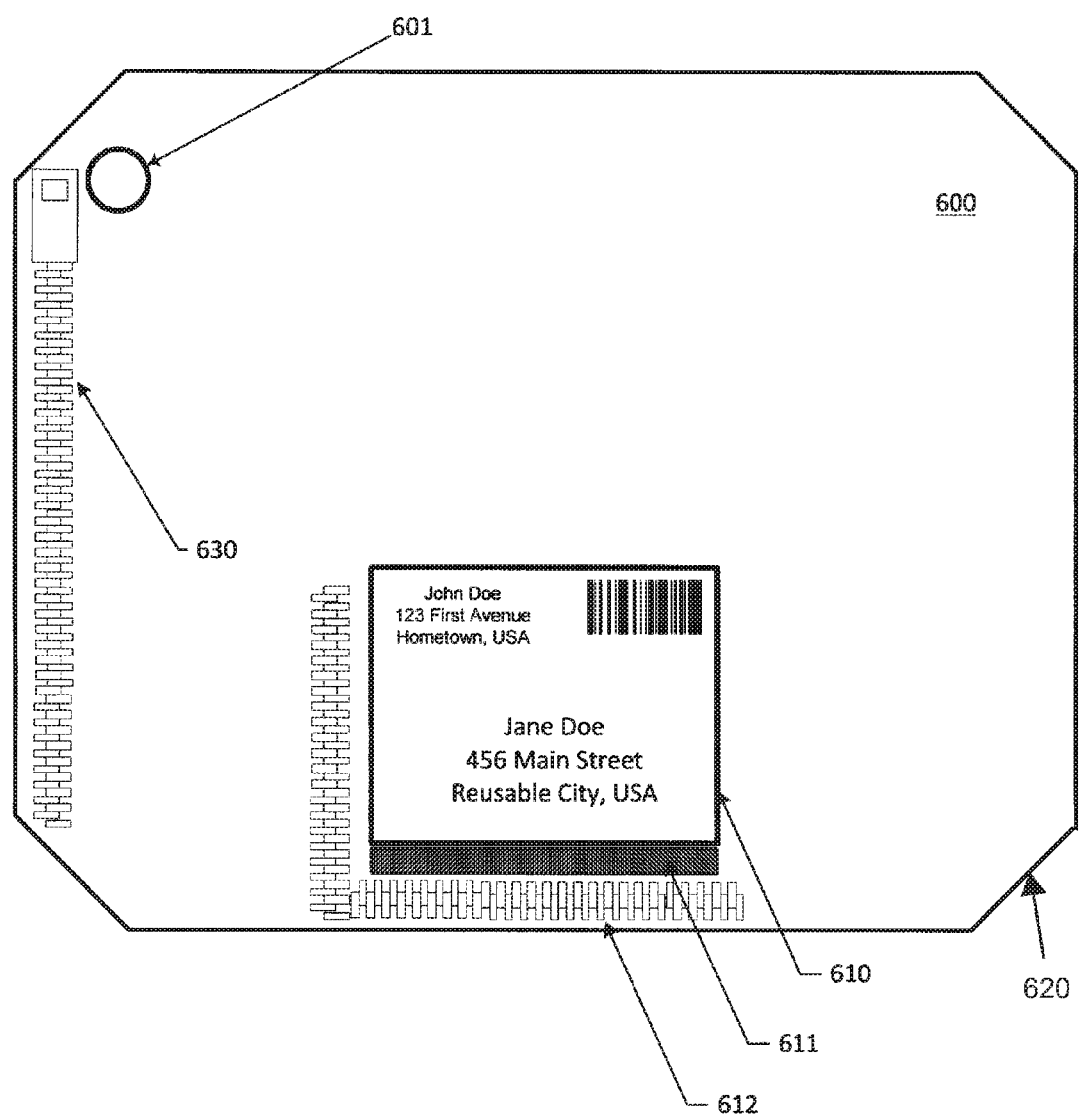
FIG. 6 illustrates an exemplary two way self-mailing bag in accordance with some embodiments of the present invention, in an open position, illustrating a zipper, mailing label, etc.

With reference to FIG. 6, an exemplary two-way mailing bag 600 in accordance with some embodiments of the present invention will now be discussed. Two-way mailing bag 600 may be formed from any suitable material, though it is contemplated that environmentally friendly material, such as pack cloth may be utilized. However, it is contemplated that any other material such as, but not limited to, nylon, cotton, canvas, jute, hemp, nonwoven materials (such as but not limited to polypropylene), polyester, polyethylene terephthalate (PET), and/or recycled PET. The two-way mailing bag 600 may be treated with various coatings, such as but not limited to Microban, and/or additional coatings to impact the functionality or performance of the mailing bag (for example, by treating the bag to become hydrophobic or otherwise water resistant or waterproof). The bag may be formed from any suitable process (sewing, adhesive, etc.). In accordance with some embodiments of the present invention the bag may be sewn using a double-stitch seam with a top-stitch overlap technique.

In general, mailing bag 600 may comprise a pocket 610 for receiving a shipping or postage label. Pocket 610 may be formed, for example, from clean vinyl polyvinyl chloride (PVC), or any other suitable material. The pocket 610 may be sized to receive a shipping label. The pocket 610 may comprise a closing mechanism such as hook-and-loop closures 611, that may be opened and reclosed once a shipping or postage label has been inserted.

Bordering the pocket 610 may run another closure device, such as but not limited to a zipper, such as a double headed or wrap around zipper 612. Closure device 612 may be used to hold the two-way mailing bag 600 in a closed or folded state, and may be opened to allow the two-way mailing bag 600 to unfold into its open state.

In order to assist with folding the two-way mailing bag 600 into its internal pouch, the bag 600 may be shaped without full corners 620. In this manner, the folding of the bag 600 into a pouch (not shown) that is adjacent to the pocket 610 may be more easily accomplished.

In order to access an internal cavity of the two-way mailing bag 600, a zipper or other closure device 630 may be utilized. As with the embodiment discussed above with regard to FIG. 4, a tab or other locking device (not pictured) may be utilized to hold the zipper in a closed position by engaging with opening 601. Opening 601 may comprise a metal gusset to prevent damage or deterioration of the mailing bag 600. Opening 601 may be utilized to store the bags in a hanging position, as well as engage a locking tab or device.

In accordance with various embodiments of the present invention, a two-way reusable mailing bag is disclosed, which comprises a larger bag or pouch that folds into a pocket, may be held into a folded position with an attachment device, and placed in the mail or for shipment. A pocket for a mailing label may be included in both a folded and an open position. This may comprise two-pockets, or may comprise a double-sided pocket that may be accessed when the mailing bag is in either a folded or open position.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense, and that the scope of the invention will be solely determined by the appended claims.

What is claimed is:

1. A two-way mailing bag comprising:
a shipping label pouch with a return shipping label and a shipping label facing opposite directions;
an internal cavity to store an item for shipment;
a pocket adjacent to the shipping label pouch;
an attachment device engagable to maintain the entire two-way mailing bag folded into the pocket when the pocket is turned inside-out; and
a closing device for closing the internal cavity;
wherein, when the two-way mailing bag is folded into the pocket the pocket is turned inside-out and the shipping label pouch and one and only one of the return shipping label and shipping label are visible without looking into the internal cavity.

2. The two-way mailing bag of claim 1, wherein the attachment device comprises hook-and-loop closures, a zipper, magnets, or snaps.

3. The two-way mailing bag of claim 1, wherein the closing device for the internal cavity comprises hook-and-loop closures, a zipper, magnets, snaps, or laces.

4. The two-way mailing bag of claim 1, wherein the shipping label pouch is visible without looking into the internal cavity when the two-way mailing bag is folded into the pocket and when the two-way mailing bag is unfolded.

5. The two-way mailing bag of claim 4, wherein the shipping label pouch opens from a front side and a back side.

6. The two-way mailing bag of claim 1, wherein the two-way mailing bag is comprised of pack cloth fabric.

7. The two-way mailing bag of claim 1, wherein the two-way mailing bag is comprised of a material selected from the group consisting of: nylon, cotton, canvas, jute, hemp, non-woven materials, polypropylene, polyester, polyethylene terephthalate (PET), and recycled PET.

8. The two-way mailing bag of claim 1, further comprising a locking device or tab configured to maintain the closing device in a closed position.

9. The two-way mailing bag of claim 8, wherein the two-way mailing bag further comprises an opening, into which the locking device or tab engages.

10. A two-way mailing bag comprising:
a shipping label pouch with a return shipping label and a shipping label facing opposite directions;
an internal cavity to store an item for shipment;
a pocket adjacent to the pouch;
a closing device for closing the internal cavity; and
an attachment device;
wherein, when the entire two-way mailing bag is folded into the pocket by turning the pocket inside-out and the attachment device is engaged, the two-way mailing bag is in a folded position and the shipping label pouch and return shipping label are visible but the shipping label is not visible;
wherein, when the two-way mailing bag is in an unfolded position and the closing device is closed, the shipping label pouch and the shipping label are visible but the return shipping label is not visible; and
wherein the attachment device is engagable to maintain the entire two-way mailing bag folded into the pocket.

11. A two-way mailing bag comprising:
a pouch configured to receive both a return shipping label and a shipping label;
an internal cavity to store an item for shipment;
a pocket;
a zipper for providing access to and closing the internal cavity; and
an attachment device;
wherein the two-way mailing bag is further configured to be folded into the pocket by turning the pocket inside-out such that the pouch and shipping label are visible when the two-way mailing bag is in a folded position, and the pouch and the return shipping label are visible when the two-way mailing bag is in an unfolded position; and
wherein the attachment device is engagable to maintain the entire two-way mailing bag folded into the pocket.

12. The two-way mailing bag of claim 11, wherein the two-way mailing bag is comprised of pack cloth fabric.

13. The two-way mailing bag of claim 11, wherein the two-way mailing bag is comprised of a material selected from the group consisting of: nylon, cotton, canvas, jute, hemp, nonwoven materials, polypropylene, polyester, polyethylene terephthalate (PET), and recycled PET.

* * * * *